(12) United States Patent
Bendejacq et al.

(10) Patent No.: US 6,790,908 B2
(45) Date of Patent: *Sep. 14, 2004

(54) BLOCK COPOLYMER

(75) Inventors: Denis Bendejacq, Cranbury, NJ (US); Mathieu Joanicot, Lawrenceville, NJ (US); Gilda Lizarraga, Cranbury, NJ (US); Virginie Ponsinet, New York City, NY (US)

(73) Assignee: Rhodia Inc., Cranbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/142,694

(22) Filed: May 9, 2002

(65) Prior Publication Data

US 2003/0212213 A1 Nov. 13, 2003

(51) Int. Cl.$^7$ .................... C08L 53/00; C08F 293/00
(52) U.S. Cl. .................... 525/71; 525/244; 525/259; 525/263; 524/505; 524/824

(58) Field of Search .................... 525/71, 244, 259, 525/263, 299, 296, 301; 524/505, 824, 804

(56) References Cited

U.S. PATENT DOCUMENTS 6,437,040 B2 * 8/2002 Anthony et al. ............ 524/505
6,579,947 B2 * 6/2003 Heitz et al. ................ 525/244

* cited by examiner

Primary Examiner—James J. Seidleck
Assistant Examiner—Olga Asinovsky

(57) ABSTRACT

The invention relates to a block copolymer and more especially to a thermoplastic elastomer block copolymer. The block copolymer is a diblock (block A)-(bloc B) copolymer, a triblock (block A)-(block B)-(block A), or a triblock (block A)-(block B)-(block C) copolymer, wherein block A is a stiff block, block B is a soft block, and block C is a stiff block. Block A or Block B comprises repetitive units deriving from segregation monomers.

20 Claims, No Drawings

BLOCK COPOLYMER

BACKGROUND OF THE INVENTION

The invention relates to block copolymers and more especially to thermoplastic elastomer block copolymers.

Thermoplastic elastomers are known. These polymers present interesting mechanical properties (elastomeric) properties, with interesting handling and shaping properties (thermoplastic). Whereas classical elastomers usually require a chemical cross linking step, usually not reversible, before or after they have been shaped or applied onto a support, thermoplastic elastomer are cross linked according to a physical phenomenon that is reversible by heating. This property allows to obtain elastomeric compounds without any chemical cross linking step that may be difficult to carry out on some supports, or that would require complex formulations (two or more components formulations, or formulations comprising a catalyst being active only upon particular conditions such as dryness). Thermoplastic Elastomers may be shaped (extrusion, injection . . . ) or applied onto a support in a melted form. They are used for various purposes in various fields, including soft touch plastics for consumer goods or car interior, structural or mechanical articles, adhesives. They may also be used as additives in thermoplastics or in compositions used in building industry, to modify the mechanical properties of said thermoplastics or compositions.

Triblock copolymers comprising two styrene stiff side blocks, and a soft central block comprising units deriving from diene monomers have been known and used for years. Examples include Styrene-Butadiene-Styrene (SBS) block copolymers, Styrene-(Ethylene Butadiene)-Styrene (SEBS) block copolymers, and hydrogenated ones. Styrene blocks are stiff blocks forming a stiff phase dispersed in a soft phase of the central block (microphase seperation). Without intending to be bound to any theory, and as a simplified view, it is believed that the dispersion of the stiff phase provides cohesion between the polymer chains, the other phase presenting elastomeric properties. This phenomenon may be referred to as a cross linking according to a physical phenomenon. Hence, a microphase separation of the blocks is believed to be a key factor. When heating, the stiff phase melts and the copolymers can be handled in a liquid form. Considerations on microphase separation of block copolymers are provided in Frank S. Bates and Glenn H. Fredrickson, *Physics Today*, February 1999 issue, pages 32–38.

The triblock copolymers mentioned above present some drawbacks. First, the central block sometime gets yellow with age. Second, for some uses, for example uses as adhesives or uses wherein compatibilization with other compounds is needed, some other functions have to be added, such as anhydride, carboxylic acid, ester, epoxide functions by copolymerizing additional comonomers. To avoid yellowing, and to address needs for some uses, block deriving from esters of acrylic acid or of methacrylic acid could be a solution.

Further, the above mentioned triblock copolymers are usually prepared by an anionic polymerization process, with optionally a hydrogenation step. Anionic polymerization processes are usually considered as expensive over free-radical polymerization processes. Hence, there is a need for block copolymers that may be prepared by free-radicals polymerization, and allow phase separation of the blocks as explained above, or, more simply, that present thermoplastic elastomers properties. On another hand, obtaining block copolymers polymers with high and controlled molecular weight is easier with an anionic polymerization process than with a free-radical polymerization process: it may be difficult to obtain high molecular weight block copolymers, with a controlled structure and with controlled molecular weights by a free-radical polymerization process. At the time being, no solution has been found to the problem of proposing a block copolymer comprising a soft block deriving mainly from esters of acrylic acid or of methacrylic acid, with reasonable cost. As an aside, it is known that the higher the molecular weight of the blocks is, the easier the phase separation is.

Applicant has found new block copolymers which address some of the needs or problems listed above. The block copolymers comprise a soft block comprising esters of acrylic acid or of methacrylic acid, which prevents or postpones yellowing, and provide the block copolymers with interesting adhesion or compatibilization properties. The block copolymer that the applicant has found may be prepared by a free-radical polymerization process. Hence, the invention also relates to a process for making the block copolymer.

BRIEF SUMMARY OF THE INVENTION

The invention relates to a block copolymer, being a diblock (block A)-(bloc B) copolymer, a triblock (block A)-(block B)-(block A), or a triblock (block A)-(block B)-(block C) copolymer, block A being a stiff block, comprising at least 55% of repetitive units deriving from a stiff monomer selected from the group consisting of styrene, isobornyl acrylate, and isobornyl methacrylate, block B being a soft block, comprising at least 55% of repetitive units deriving from a soft monomer selected from the group consisting of esters of acrylic acid, esters of methacrylic acid, and mixtures thereof, block C being a stiff block, comprising repetitive units deriving from a stiff monomer selected from the group consisting of styrene, isobornyl acrylate, and isobornylmethacrylate, wherein:

block A comprises at least 6% by weight of units deriving from a block A segregation monomer selected from the group consisting of acrylic acid, methacrylic acid, acrylonitrile, methacrylonitrile, 2-vinylpyridine, and 4-vinylpyridine, or block B comprises at least 6% by weight of units deriving from a block B segregation monomer selected from the group consisting of acrylic acid, methacrylic acid, acrylonitrile, methacrylonitrile, and vinylpyrrolidones, and the block copolymer has a molecular weight of more than 10,000 g/mol.

The block copolymers according to the invention may be in a solid or dried form. They may also be dissolved in an organic solvent. They may also be in the form of a latex dispersion in an aqueous medium. Such dispersions or solutions are usually intended to be applied onto a surface, and then dried, to make a film or a coating. In a dried form, the block copolymer according to the invention presents elastomeric properties. It presents also thermoplastic properties.

In a second aspect, the invention relates to a process for making the block copolymer defined above, said process being a sequenced living (and controlled) free-radical polymerization process, preferably involving using a transfer agent comprising a group of formula —S—C(S)—X—, —S—C(S)—S—, or —S—P(S)—X—, or —S—P(S)—S—, wherein X is an atom different from sulfur.

In a third aspect, the invention relates to the use of the block copolymer defined above as an adhesive, to its use in an adhesive composition, and to adhesive compositions or products comprising it.

DETAILED DESCRIPTION OF THE INVENTION

The block copolymer comprises at least two different blocks: block A and block B. It is selected from the group consisting of diblock (block A)-(bloc B) copolymers, triblock (block A)-(block B)-(block A), or triblock (block A)-(block B)-(block C) copolymers. The block copolymer is a linear block copolymer. By linear it is meant that the arrangement of the blocks is linear. However, a block may comprise units comprising a side chain macromolecular group.

A block is usually defined by the repeating units it comprises. A block may be defined by naming a polymer, or by naming monomers it derives from. In the present specification, a unit deriving from a monomer is understood as a unit that may directly be obtained from the said monomer by polymerizing. Thus, a unit deriving from an ester of acrylic or methacrylic acid does not encompass a unit of formula —CH—CH(COOH)— or —CH—C(CH$_3$)(COOH)—, obtained for example by polymerizing an ester of acrylic or methacrylic acid and then hydrolyzing. But a unit deriving from acrylic acid or methacrylic acid encompasses for example a unit obtained by polymerizing a monomer and reacting to obtain units of formula —CH—CH(COOH)— or —CH—C(CH$_3$)(COOH)—.

At least one of the blocks, block A, or block B is a copolymer, comprising at least two different repeating units, deriving form at least two different monomers. Block A, block B, and block C are different polymers, deriving from different monomers, but they may comprise some common repeating units. Block A and block B preferably do not comprise more than 50% of a common repeating unit (derived from the same monomer). Block C and block B preferably do not comprise more than 50% of a common repeating unit (derived from the same monomer). Block A and block C may comprise up to 94% by weight of a common repeating unit.

It is further mentioned that in triblock (block A)-(block B)-(block A) copolymers, the two blocks A may have an identical or different molecular weight. They may comprise units deriving from an identical or different block A segregation monomer. They may comprise an identical or different amount (at least 6% by weight) of units deriving from said segregation monomer. Block C is a block that does not comprise units deriving from a block A segregation monomer, or that does not comprise more than 6% by weight of units deriving from a block A segregation monomer.

Block A and block C are referred to as stiff blocks. Block B is referred to as a soft block. In the present specification, the words "stiff" and "soft" refer to the property that a block would have without the other block(s), that is the property of a polymer consisting of the same repeating units than said block, having preferably the same molecular weight. A stiff polymer, or block, usually has a glass transition temperature of greater than 50° C., and preferably of greater than 100° C. A soft polymer, or block, usually has a glass transition temperature of lower than 20° C., more preferably of lower than 0° C.

In the present specification, the language "stiff monomers" refers to monomers a polymer deriving thereof would be stiff. In the present specification, the language "soft monomers" refers to monomers a polymer deriving thereof would be soft.

In the present specification, the molecular weight of a block copolymer refers to the weight-average molecular weight of the block copolymer. The weight-average molecular weight of the polymer can be measured by gel permeation chromatography (GPC). In the present specification, the molecular weight of a block refers to the molecular weight calculated from the amounts of monomers, polymers (for example another block), initiators and/or transfer agents used to make the block. The one skilled in the art knows how to calculate these molecular weights. The ratios by weight between the blocks refer to the ratios between the amounts of the compounds used to make said blocks, considering an extensive polymerization.

Typically the molecular weight M of a block is calculated according to the following formula:

$$M = \sum_i M_i * \frac{n_i}{n_{precursor}},$$

wherein $M_i$ is the molecular weight of a precursor monomer i, $n_i$ is the number of moles of a monomer i, and $n_{precursor}$ is the number of moles of a compound the macromolecular chain of the block will be linked to. Said compound may be a transfer agent or a transfer group, or a previous block. If it is a previous block, the number of moles may be considered as the number of moles of a compound the macromolecular chain of said previous block has been linked to, for example a transfer agent or a transfer group. It may be also obtained by a calculation from a measured value of the molecular weight of said previous block. If two blocks are simultaneously grown from a previous block, at both ends, the molecular weight calculated according to the above formula should be divided by two.

According to a first embodiment:
Block A comprises at least 55% by weight of units deriving from stiff monomers detailed below,
Block A comprises also at least 6%, preferably at least 10%, even more preferably at least 15%, by weight of units deriving from block A segregation monomers detailed below,
Block B comprises at least 55% by weight of units deriving form soft monomers detailed below, and
Block B does not comprise any units deriving from block B segregation monomers detailed below, or does not comprise more than 6% of any units deriving from block B segregation monomers detailed below.

According to a second embodiment:
Block A comprises at least 55% by weight of units deriving from stiff monomers detailed below,
Block A does not comprise any units deriving from block A segregation monomers detailed below, or does not comprise more than 6% of any units deriving from block A segregation monomers detailed below,
Block B comprises at least 55% by weight of units deriving form soft monomers detailed below, and
Block B comprises also comprises at least 6%, preferably at least 10%, even more preferably at least 15%, by weight of units deriving from block B segregation monomers detailed below.

According to a third embodiment:
Block A comprises at least 55% by weight of units deriving from stiff monomers detailed below, Block A comprises also comprises at least 6%, preferably at least 10%, even more preferably at least 15%, by weight of units deriving from block A segregation monomers detailed below, Block B comprises at least 55% by weight of units deriving from soft monomers detailed below, Block B comprises also comprises at least 6%, preferably at least 10%, even more preferably at least 15%, by weight of units deriving from block B segregation monomers detailed below, and Block B segregation monomers are different from block A segregation monomers.

Block copolymers according the three embodiments above may also comprise a block C, comprising units deriving from stiff monomers detailed below. Block C does not comprise any units deriving from block A segregation monomer detailed below, or does not comprise more than 6% of any units deriving from block A segregation monomer detailed below. Preferably, block C comprises at least 80% by weight, preferably at least 94% by weight, of units deriving from stiff monomers.

Block A and block B may comprise some units different from units deriving from the stiff monomers and the segregation monomers (block A or block B segregation monomers) detailed below. If not, the amount by weight of units deriving from the stiff, respectively soft, monomers is equal to 100% minus the amount of block A, respectively block B, segregation monomer.

The stiff monomers mentioned above are selected from the group consisting of Styrene, isobornyl acrylate, and isobornylmethacrylate.

The block A segregation monomers mentioned above are selected from the group consisting of acrylic acid, methacrylic acid, acrylonitrile, methacrylonitrile, 2-vinylpyridine, and 4-vinylpyridine.

The soft monomers mentioned above are selected from the group consisting of esters of acrylic acid and esters of methacrylic acid, such as 2-ethylhexyl acrylate, 2-ethylhexyl methacrylate, ethyl acrylate, ethyl methacrylate, butyl acrylate, and butyl methacrylate. Mixtures of these monomers can be used, to obtain a block comprising units deriving thereof, the block being thus a random copolymer. Using mixtures allows controlling the glass transition temperature of the soft block. For example, mixtures of ethyl acrylate or ethyl methacrylate and butyl acrylate or butyl methacrylate can be used. These monomers, the units deriving therefrom, and block or polymer comprising said units, are usually considered as hydrophobic.

The block B segregation monomers mentioned above are selected from the group consisting of acrylic acid, methacrylic acid, acrylonitrile, methacrylonitrile, and vinylpyrrolidones.

Without intending to be bound to any theory, it is believed that the monomers referred to as segregation monomers boost the incompatibility of a block with another, and thus allow a phase segregation, a stiff phase being dispersed is continuous soft phase. Block A segregation monomers would boost the incompatibility of block A toward block B. Block B segregation monomers would boost the incompatibility of block B toward block A. Some monomers may as well boost the incompatibility of block A toward block B and the incompatibility of block B toward block A. Thus, some monomers are considered as block A segregation monomers and/or block B segregation monomers. However, it is preferred that if both block A and block B comprise more than 6% by weight of segregation monomers, then block A segregation monomer is different from block B segregation monomer, or the amount (weight %) of block A segregation monomers in block A is different from the amount (weight %) of block B segregation monomers in block B.

The block copolymer according to the invention has a molecular weight of at least 10000 g/mol, preferably of at least 25000 g/mol, and even more preferably of at least 50000 g/mol. The molecular weight is usually of lower than 200000 g/mol. It may be of lower than 150000 g/mol, and even of lower than 100000 g/mol. Obtaining properties of a thermoplastic elastomer, with a stiff phase being dispersed in a continuous elastomeric phase, at such low molecular weights is one of the merits and interests of the invention.

Preferably, block A has a molecular weight of between 1000 and 30000, and more preferably of between 3000 and 15000 g/mol. Preferably, block B has a molecular weight of between 6000 and 12000, and more preferably of between 6000 and 97000 g/mol. More preferably, block B has a molecular weight comprised between 20000 and 80000 g/mol.

The ratio between the molecular weight of block(s) A and the molecular weight of block B is preferably comprised between 0.45 and 0.5, more preferably between 0.05 and 0.3.

Preferably, block A derives mainly from styrene, and block B derives mainly from ethyl acrylate or butyl acrylate, for example as follows:

block A comprises from 75% to 90% by weight of units deriving from styrene, and from 10% to 25% by weight of units deriving from acrylic acid or methacrylic acid, and block B comprises at least 75% by weight of units deriving from ethyl acrylate, butyl acrylate or mixtures thereof.

According to a first preferred embodiment, the block copolymer is a diblock (block A)-(block B) copolymer wherein block A comprises units deriving from styrene and units deriving from methacrylic acid, and block B comprises units deriving from ethyl acrylate, and wherein:

block A comprises from 75% to 90% by weight of units deriving from styrene, and from 10% to 25% by weight of units deriving from methacrylic acid, and block B comprises at least 75% by weight of units deriving from ethyl acrylate, or a mixture of ethyl acrylate and butyl acrylate.

According to a second preferred embodiment, the block copolymer is a triblock (block A)-(block B)-(block A) copolymer wherein block A comprises units deriving from styrene and units deriving from methacrylic acid, and block B comprises units deriving from ethyl acrylate, and wherein:

block A comprises from 75% to 90% by weight of units deriving from styrene, and from 10% to 25% by weight of units deriving from methacrylic acid, and block B comprises at least 75% by weight of units deriving from ethyl acrylate, or a mixture of ethyl acrylate and butyl acrylate.

According to a third preferred embodiment, the block copolymer is a triblock (block A)-(block B)-(block A) copolymer wherein block A comprises units deriving from styrene and units deriving from methacrylic acid, and block B comprises units deriving from butyl acrylate, and wherein:

block A comprises from 75% to 90% by weight of units deriving from styrene, and from 10% to 25% by weight of units deriving form acrylic acid or methacrylic acid, and block B comprises at least 75% by weight of units deriving from butyl acrylate.

According to a forth preferred embodiment, the block copolymer is a triblock (block A)-(block B)-(block A) copolymer wherein block A comprises units deriving from styrene and units deriving from methacrylic acid, and block B comprises units deriving from 2-ethylhexyl acrylate, and wherein:

block A comprises from 75% to 90% by weight of units deriving from styrene, and from 10% to 25% by weight of units deriving from methacrylic acid, and block B comprises at least 75% by weight of units deriving from 2-ethylhexyl acrylate, or a mixture of 2-ethylhexyl acrylate and ethyl acrylate and/or butyl acrylate.

According to a fifth preferred embodiment, the block copolymer is a triblock (block A)-(block B)-(block C) copolymer wherein block A comprises units deriving from styrene and units deriving from methacrylic acid, block B comprises units deriving from 2-ethylhexyl acrylate, butyl acrylate or ethyl acrylate, and block C comprises units deriving from styrene, and wherein:

block A comprises from 75% to 90% by weight of units deriving from styrene, and from 10% to 25% by weight of units deriving from methacrylic acid, block B comprises at least 75% by weight of units deriving from 2-ethylhexyl acrylate, butyl acrylate, ethyl acrylate, or mixtures thereof, and block C comprises at least 94% by weight of units deriving from styrene.

Block copolymers according to the invention may be obtained by several processes. Examples of processes include "living" or "controlled" free-radical polymerization processes. Such processes involve using a transfer agent that is specific for this purpose.

Generally, block copolymers can be obtained by any "living" or "controlled" polymerization process, such as, for example:

free-radical polymerization controlled by xanthates according to the teaching of Application WO 98/58974 and U.S. Pat. No. 6,153,705, free-radical polymerization controlled by dithioesters according to the teaching of Application WO 98/01478, free-radical polymerization controlled by dithioesters according to the teaching of Application WO 99/35178, free-radical polymerization controlled by dithiocarbamates according to the teaching of Application WO 99/35177, free-polymerization using nitroxide precursors according to the teaching of Application WO 99/03894, free-radical polymerization controlled by dithiocarbamates according to the teaching of Application WO 99/31144, free-radical polymerization controlled by dithiocarbazates according to the teaching of Application WO 02/26836, free-radical polymerization controlled by halogenated Xanthates according to the teaching of Application WO 00/75207 and U.S. application Ser. No. 09/980,387, free-radical polymerization controlled by dithiophosphoroesters according to the teaching of Application WO 02/10223, free-radical polymerization controlled by a transfer agent in the presence of a disulphur compound according to the teaching of Application WO 02/22688, atom transfer radical polymerization (ATRP) according to the teaching of Application WO 96/30421, free-radical polymerization controlled by iniferters according to the teaching of Otu et al., Makromol. Chem. Rapid. Commun., 3, 127 (1982), free-radical polymerization controlled by degenerative transfer of iodine according to the teaching of Tatemoto et al., Jap. 50, 127, 991 (1975), Daikin Kogyo Co Ltd Japan, and Matyjaszewski et al., Macromolecules, 28, 2093 (1995), group transfer polymerization according to the teaching of Webster O. W., "Group Transfer Polymerization", p. 580–588, in the "Encyclopedia of Polymer Science and Engineering", Vol. 7, edited by H. F. Mark, N. M. Bikales, C. G. Overberger and G. Menges, Wiley Interscience, New York, 1987, radical polymerization controlled by tetraphenylethane derivatives (D. Braun et al., Macromol. Symp., 111, 63 (1996)), radical polymerization controlled by organocobalt complexes (Wayland et al., J. Am. Chem. Soc., 116, 7973 (1994)).

Preferred processes are sequenced living free-radical polymerization processes, involving the use of a transfer agent. Preferred transfer agents are agents comprising a group of formula —S—C(S)—Y—, —S—C(S)—S—, or —S—P(S)—Y—, or —S—P(S)—S—, wherein Y is an atom different from sulfur, such as an oxygen atom, a nitrogen atom, and a carbon atom. They include dithioester groups, thioether-thione groups, dithiocarbamate groups, dithiphosphoroesters, dithiocarbazates, and xanthate groups. Examples of groups comprised in preferred transfer agents include groups of formula —S—C(S)—NR—NR'$_2$, —S—C(S)—NR—N=CR'$_2$, —S—C(S)—O—R, —S—C(S)—CR=CR'$_2$, and —S—C(S)—X, wherein R and R' are or identical or different hydrogen atoms, or organic groups such as hydrocarbyl groups, optionally substituted, optionally comprising heteroatoms, and X is an halogen atom. A preferred polymerization process is a living radical polymerization using xanthates.

A "living" or "controlled" free-radical polymerization process used to make block copolymers comprises for example the steps of:

a) reacting monomers or a mixture of monomers, at least a free radicals source compound, and a transfer agent, to obtain a first block (preferably block A), the transfer agent being linked to said first block, b) reacting the first block, monomers or a mixture of monomers, and, optionally, at least a radical source compound, to obtain a diblock copolymer (preferably (block A)-(block B)), c) optionally, reacting the diblock copolymer, monomers or a mixture of monomers, and, optionally, at least a radical source compound, to obtain a triblock copolymer (preferably (block A)-(block B)-(block A) or(block A)-(block B)-(block C)), and then d) optionally, reacting the transfer agent with means to render it inactive, or to remove it.

During step a), a first block of the block copolymer polymer is prepared, preferably block A, using preferably stiff monomers and optionally block A segregation monomers. During step b), a second block is obtained, preferably block B, linked to the first block, to obtain a diblock copolymer, preferably block B, using soft monomers and optionally block B segregation monomers. During optional step c) a third block is obtained, linked to the second block, preferably block A or block C, to obtain a triblock copolymer, using stiff monomers and optionally block A segregation monomers. During step d) the transfer agent is reacted to render it inactive, or to avoid smell or yellow coloration.

Examples of transfer agents are transfer agents of the following formula (I):

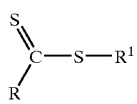
(I)

wherein:

R represents an $R^2O—$, $R^2R'^2N—$ or $R^3$-group, $R^2$ and $R'^2$, which are identical or different, representing (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, $R^3$ representing H, Cl, an alkyl, aryl, alkene or alkyne group, an optionally substituted, saturated or unsaturated (hetero)cycle, an alkylthio, alkoxycarbonyl, aryloxycarbonyl, carboxyl, acyloxy, carbamoyl, cyano, dialkyl- or diarylphosphonato, or dialkyl- or diarylphosphinato group, or a polymer chain, $R^1$ represents (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and The $R^1$, $R^2$, $R'^2$ and $R^3$ groups can be substituted by substituted phenyl or alkyl groups, substituted aromatic groups or the following groups: oxo, alkoxycarbonyl or aryloxycarbonyl (—COOR), carboxyl (—COOH), acyloxy (—$O_2$CR), carbamoyl (—$CONR_2$), cyano (—CN), alkylcarbonyl, alkylarylcarbonyl, arylcarbonyl, arylalkylcarbonyl, isocyanato, phthalimido, maleimido, succinimido, amidino, guanidino, hydroxyl (—OH), amino (—$NR_2$), halogen, allyl, epoxy, alkoxy (—OR), S-alkyl, S-aryl or silyl, groups exhibiting a hydrophilic or ionic nature, such as alkaline salts of carboxylic acids or alkaline salts of sulphonic acid, poly(alkylene oxide) (PEO, PPO) chains, or cationic substituents (quaternary ammonium salts), R representing an alkyl or aryl group.

Preferably, the transfer agent of formula (I) is a dithiocarbonate chosen from the compounds of following formulae (IA), (IB) and (IC):

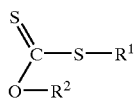
(IA)

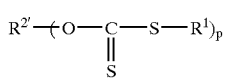
(IB)

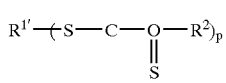
(IC)

wherein:

$R^2$ and $R^{2'}$ represent (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, $R^1$ and $R^{1'}$ represent (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and p is between 2 and 10.

Other examples of transfer agents are transfer agents of the following formulae (II) and (III):

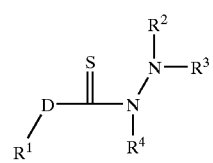
(II)

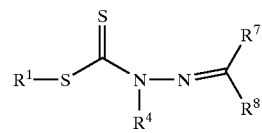
(III)

wherein $R^1$ is an organic group, for example a group $R^1$ as defined above for tranfer agents of formulae (I), (IA), (IB), and (IC), $R^2$, $R^3$, $R^4$, $R^7$, and $R^8$ which are identical or different are hydrogen atoms or organic groups, optionally forming rings. Examples of $R^2$, $R^3$, $R^4$, $R^7$, and $R^8$ organic groups include hydrocarbyls, subsituted hydrocabyls, heteroatom-containing hydrocarbyls, and substututed heteroatom-containing hydrocarbyls.

According to the above described process, if all the successive polymerizations are carried out in the same reactor, it is generally preferable for all the monomers used during one step to have been consumed before the polymerization of the following step begins, therefore before the new monomers are introduced. However, it may happen that some monomers of the preceding step are still present in the reactor during the polymerization of the following block. In this case, these monomers generally do not represent more than 5 mol % of all the monomers and they participate in the following polymerization by contributing to the introduction of the other units into the following block.

The polymerization can be carried out in an aqueous and/or organic solvent medium. The polymerization can also be carried out in a substantially neat melted form (bulk polymerization), or according to a latex type process in an aqueous medium.

The block copolymer may be in a solid and/or dried form. It may also be in solution in an organic solvent. It may also be in the form of a dispersion in an aqueous medium, in a latex form. It usually depends of the process used for its preparation. If not in a solid and/or dried form, the solvent or the aqueous medium are usually intended to be removed, to obtain the block copolymer in a solid and/or dried form. For example, the solvent or the aqueous medium may be removed by evaporation, or drying, after the solution or latex dispersion has been applied onto a surface, to obtain a film or a coating, in a solid and/or dried form.

If in a solid form, the block copolymer according to the invention may be melted, to be shaped, or applied onto a surface. Then, it may be cooled, to obtain a solid article, film, or coating.

It is believed that when in a solid or dried form, the soft block of the block copolymer according to the invention forms a continuous soft phase, and the stiff block(s) forms a stiff phase, the stiff phase being dispersed in the soft phase. As explained above, and without intending to be bound to any theory, it is believed that this phase separation provides cohesion, by a cross linking according to a physical phenomenon.

When in a solid or dried form the block copolymer according to the invention presents an elastomeric property, and a thermoplastic property. It may be refer to as a Thermoplastic Elastomer.

Thus, the block copolymer according to the invention has, in a solid or dried from an elongation at break of at least 500% and tensile strength of at least 1.5 MPa. Preferably the elongation at break is of at least 750% and the tensile strength is of at least 2.0 MPa. These properties are considered as being the properties of an elastomeric compound.

Block copolymers according to the invention find use in numbers of fields. They may be used for manufacturing articles. Block copolymers according to the invention are for example in the form of powders, chips, solid granules, optionally compounded with other ingredients, for being melted, introduced in a mold in a liquid form, and then cooled to obtain an article in a solid form. Articles obtained from the block copolymers usually present an interesting touch, which may be referred to as soft or tacky (compared to other thermoplastics) . . . . Articles obtained from the block copolymers according to the invention also present elastomeric properties that may be needed. The thermoplastic properties allow making articles with elastomeric properties with shapes that would have been difficult to obtain with a polymer or a composition that would have required a chemical cross linking. It may simplify the process for making elastomeric articles, or simplify the compositions used to make such articles.

It is mentioned that, to make articles, the block copolymer may be used alone, or with some other ingredients, as a compound in an engineering plastic formulation. Depending on the amount of the different ingredients, the block copolymer may be considered as an additive to modify the properties of another polymer, or as a polymer having properties modified by other ingredients. It is further mentioned that the copolymer may comprise units that enhance a compatibility with other compounds of a composition, such as units comprising an epoxy group, or a maleic anhydride group. Useful groups are known by the one skilled in the art of thermoplastic formulations.

Some block copolymers according to the invention may be used as an adhesive compound. They may be used as a compound in an adhesive composition. Block copolymers wherein the soft monomer is butyl acrylate or butyl methacrylate are especially preferred for the use as an adhesive compound. It is further mentioned that the copolymer may comprise units that enhance adhesive properties or compatibility with other compounds, such as units comprising an epoxy group, or a maleic anhydride group. Useful groups are known by the one skilled in the art of adhesive compositions.

For example block copolymers according to the invention, or compositions comprising said block copolymers, preferably block copolymers wherein the soft monomer is butyl acrylate or butyl methacrylate, may be coated onto a surface, in a melted form, in the form of a solution or in the form of a latex dispersion in an aqueous medium, to obtain an adhesive layer. The surface is for example a base layer, forming an adhesive tape, together with the adhesive layer. Thus, the surface the composition is coated onto may be for example a plastic film, or a paper-type product.

The block copolymer according to the invention may be comprised in formulations intended to be applied onto a surface, used in building construction or in home improvement, for example in paints formulations (industrial paints, domestic paints or decorative paints). The block copolymer may also be comprised in a mastic, cement, or filler formulation. Formulations wherein the block copolymer is in the form of a latex dispersion are especially preferred. Whereas the dispersion is not very viscous in paints, the viscosity of mastic, cement or filler formulation is usually quiet high. The block copolymer may provide a coating or a paint layer with some particular properties in relation with elasticity, such as cracking resistance, impact resistance, marks resistance, resistance to dirt deposition . . . . Mastics, cements, or fillers comprising the block copolymer according to the invention present improved properties over mastics, cements, or fillers comprising ester of (meth) acrylic acid-based polymers. The so-called cross linking by a physical phenomenon mentioned above, make the use of the block copolymers particularly useful since there is no need to perform a cross linking step after the formulation has been applied onto a surface, or to use complex, very sensitive or environment or health harmful formulations (two pack formulations, formulation comprising a catalyst that is inhibited in the presence of water . . . ). The so-called cross linking by a physical phenomenon also allows control of flow properties and tackiness.

Some illustrative but non-limiting examples are provided hereunder for the better understanding of the invention.

EXAMPLES

Example 1

Diblock Copolymer poly(styrene/methacrylic acid)-block-poly(ethyl acrylate/methacrylic acid) (St/MMA)-b-(EtA/MMA)) wherein St/MMA=80/20 and EtA/MMA=95/5

Step 1: Synthesis of a Random Block (St/MMA) of Styrene (St) and Methacrylic Acid (MAA) with a Ratio by Weight of St/MAA=80/20.

A polymerization is carried out under emulsion conditions in a jacketed reactor equipped with a stainless steel three-bladed stirrer. 300 g of water, 7.46 g of sodium dodecyl sulphate (Aldrich) and 1.87 g of sodium carbonate $Na_2CO_3$ are introduced at ambient temperature as a starting mix. The mixture obtained is stirred for 30 minutes (190 rev/min) during which the temperature is raised to 75° C. Then a mixture comprising 3.00 g of styrene, 1.56 g of methyl α-(o-ethylxanthyl)propionate $(CH_3CHCO_2Me)SCSOEt$, and 0.75 g of methacrylic acid is incorporated. The temperature is subsequently raised to 85° C. and 0.31 g of ammonium persulphate $(NH_4)_2S_2O_8$ are added. After five minutes, the addition is continued of 27.0 g of styrene, 6.75 g of methacrylic acid over one hour. After the addition is completed, an emulsion copolymer (latex) is obtained, which is maintained at 85° C. for one hour.

Step 2: Synthesis of a Random Block (EtA/MMA) of Ethyl Acrylate (EtA) and Methacrylic Acid (MMA) with a Ratio by Mass: EtA/MAA=95/5, to Obtain a Diblock Copolymer 58.12 g of the emulsion copolymer obtained above are withdrawn from the reactor. 0.13 g of ammonium persulphate $(NH_4)_2S_2O_8$ and 5.0 g of water are added to the emulsion remaining in the reactor at 85° C. After five minutes, the addition is begun of the following a mixture comprising:

363.78 g of ethyl acrylate (EtA), and 19.15 g of methacrylic acid (MAA)

and simultaneously of another mixture comprising:

385 g of water, and 1.06 g of $Na_2CO_3$.

The addition lasts 1 hour. The system is maintained at this temperature for an additional three hours.

The calculated molecular weight of the (St/MMA) block is of 5000 g/mol, and the calculated molecular weight of the (EtA/MMA) block is of 62500 g/mol.

Example 2

Triblock poly(styrene/methacrylic acid)-block-poly (ethyl acrylate/methacrylic acid)-block poly(styrene/methacrylic acid) (St/MMA)-b-(EtA)-b-(St/MMA) wherein St/MMA=80/20 in the First Block, St/MMA=98/2 in the Third Block, and EtA/MMA=95/5

Step 1: Synthesis of a First Random Block (St/MMA) of Styrene (St) and Methacrylic Acid (MAA) with a Ratio by Weight of St/MAA=80/20.

A polymerization is carried out under emulsion conditions in a jacketed reactor equipped with a stainless steel three-bladed stirrer. 300 g of water, 7.46 g of sodium dodecyl sulphate (Aldrich) and 1.87 g of sodium carbonate $Na_2CO_3$ are introduced at ambient temperature as a starting mix. The mixture obtained is stirred for 30 minutes (190 rev/min) during which the temperature is raised to 75° C. Then a mixture comprising 3.00 g of styrene, 1.56 g of methyl α-(o-ethylxanthyl)propionate $(CH_3CHCO_2Me)SCSOEt$, and 0.75 g of methacrylic acid is incorporated. The temperature is subsequently raised to 85° C. and 0.31 g of ammonium persulphate $(NH_4)_2S_2O_8$ are added. After five minutes, the addition is continued of 27.0 g of styrene, 6.75 g of methacrylic acid over one hour. After the addition is completed, an emulsion copolymer (latex) is obtained, which is maintained at 85° C. for one hour.

Step 2: Synthesis of a Second Random Block (EtA/MMA) of Ethyl Acrylate (EtA) and Methacrylic Acid (MMA) with a Ratio by Mass: EtA/MAA=95/5, to Obtain a Diblock Copolymer 58.12 g of the emulsion copolymer obtained above are withdrawn from the reactor. 0.13 g of ammonium persulphate $(NH_4)_2S_2O_8$ and 5.0 g of water are added the emulsion remaining in the reactor at 85° C. After five minutes, the addition is begun of the following a mixture comprising:

363.78 g of ethyl acrylate (EtA), and 19.15 g of methacrylic acid (MAA)

and simultaneously of another mixture comprising:

385 g of water, and 1.06 g of $Na_2CO_3$.

The addition lasts 1 hour. The system is maintained at this temperature for an additional three hours. An emulsion copolymer (latex) is obtained.

Step 3: Synthesis of a Third Random Block (St/MMA) of Styrene (St) and Methacrylic Acid (MMA) with a Ratio by Mass: St/MAA=98/2, to Obtain a Triblock Copolymer 212.94 g of the emulsion copolymer obtained above are withdrawn from the reactor. 0.05 g of ammonium persulphate $(NH_4)_2S_2O_8$ and 4.0 g of water are added the emulsion remaining in the reactor at 85° C. After five minutes, the addition is begun of the following mixture comprising:

24.02 g of styrene (St), and 0.49 g of methacrylic acid (MAA)

and simultaneously of another mixture comprising:

32.0 g of water, and 0.03 g of $Na_2CO_3$.

The addition lasts 1 hour. The system is maintained at this temperature for an additional hour.

The calculated molecular weight of the first (St/MMA) block is of 5000 g/mol, the calculated molecular weight of the second (EtA/MMA) block is of 62500 g/mol, and the calculated molecular weight of the third (St/MMA) block is of 500 g/mol.

Example 3 (Comparative)

Diblock poly(styrene/methacrylic acid)-block-poly (ethyl acrylate/methacrylic acid) (St/MMA)-b-(EtA/MMA) wherein St/MMA=96/4 and EtA/MMA=95/5

Step 1: Synthesis of a Random Block (St/MMA) of Styrene (St) and Methacrylic Acid (MAA) with a Ratio by Weight of St/MAA=96/4.

A polymerization is carried out under emulsion conditions in a jacketed reactor equipped with a stainless steel three-bladed stirrer 450 g of water, 9.32 g of sodium dodecyl sulphate (Aldrich) and 0.38 g of sodium carbonate $Na_2CO_3$ are introduced at ambient temperature as a starting mix. The mixture obtained is stirred for 30 minutes (190 rev/min) during which the temperature is raised to 75° C. Then a mixture comprising 4.50 g of styrene, 1.95 g of methyl a-(o-ethylxanthyl)propionate $(CH_3CHCO_2Me)SCSOEt$, and 0.19 g of methacrylic acid is incorporated. The temperature is subsequently raised to 85° C. and 2.28 g of ammonium persulphate $(NH_4)_2S_2O_8$ are added. After five minutes, the addition is continued of 40.5 g of styrene, 1.69 g of methacrylic acid over one hour. After the addition is completed, an emulsion copolymer (latex) is obtained, which is maintained at 85° C. for one hour.

Step 2: Synthesis of a Random Block (EtA/MMA) of Ethyl Acrylate (EtA) and Methacrylic Acid (MMA) with a Ratio by Mass: EtA/MAA=95/5, to Obtain a Diblock Copolymer 113.51 g of the emulsion copolymer obtained above are withdrawn from the reactor. 0.17 g of ammonium persulphate $(NH_4)_2S_2O_8$ and 7.0 g of water are added to the emulsion remaining in the reactor at 85° C. After five minutes, the addition is begun of the following a mixture comprising:

424.41 g of ethyl acrylate (EtA), and 22.34 g of methacrylic acid (MAA) and simultaneously of another mixture comprising:

385 g of water, and 1.24 g of $Na_2CO_3$.

The addition lasts 1 hour. The system is maintained at this temperature for an additional three hours.

The calculated molecular weight of the (St/MMA) block is of 5000 g/mol, and the calculated molecular weight of the (EtA/MMA) block is of 62500 g/mol.

Example 4 (Comparative)

Triblock poly(styrene/methacrylic acid)-block-poly (ethyl acrylate/methacrylic acid)-block-poly(styrene/methacrylic acid) (St/MMA)-b-(EtA/MMA)-b(St/MMA) wherein St/MMA=80/20 in the First Block, St/MMA=95/5 in the Third Block, and EtA/MMA=95/5

Step 1: Synthesis of a Random Block (St/MMA) of Styrene (St) and Methacrylic Acid (MAA) with a Ratio by Weight of St/MAA=96/4

A polymerization is carried out under emulsion conditions in a jacketed reactor equipped with a stainless steel three-bladed stirrer. 450 g of water, 9.32 g of sodium dodecyl sulphate (Aldrich) and 0.38 g of sodium carbonate $Na_2CO_3$ are introduced at ambient temperature as a starting mix. The mixture obtained is stirred for 30 minutes (190 rev/min) during which the temperature is raised to 75° C. Then a mixture comprising 4.50 g of styrene, 1.95 g of methyl α-(o-ethylxanthyl)propionate $(CH_3CHCO_2Me)SCSOEt$, and 0.19 g of methacrylic acid is incorporated. The temperature is subsequently raised to 85° C. and 2.28 g of ammonium persulphate $(NH_4)_2S_2O_8$ are added. After five minutes, the addition is continued of 40.5 g of styrene, 1.69 g of methacrylic acid over one hour. After the addition is completed, an emulsion copolymer (latex) is obtained, which is maintained at 85° C. for one hour.

Step 2: Synthesis of a Random Block (EtA/MMA) of Ethyl Acrylate (EtA) and Methacrylic Acid (MMA) with a Ratio by Mass: EtA/MAA=95/5, to Obtain a Diblock Copolymer 113.51 g of the emulsion copolymer obtained above are withdrawn from the reactor. 0.17 g of ammonium persulphate $(NH_4)_2S_2O_8$ and 7.0 g of water are added to the emulsion remaining in the reactor at 85° C. After five minutes, the addition is begun of the following a mixture comprising:

424.41 g of ethyl acrylate (EtA), and 22.34 g of methacrylic acid (MAA)

and simultaneously of another mixture comprising:

385 g of water, and 1.24 g of $Na_2CO_3$.

The addition lasts 1 hour. The system is maintained at this temperature for an additional three hours. An emulsion copolymer (latex) is obtained.

Step 3: Synthesis of a Third Random Block (St/MMA) of Styrene (St) and Methacrylic Acid (MMA) with a Ratio by Mass: St/MAA=95/5, to Obtain a Triblock Copolymer 353.55 g of the emulsion copolymer obtained above are withdrawn from the reactor. 0.07 g of ammonium persulphate $(NH_4)_2S_2O_8$ and 5.0 g of water are added to the emulsion remaining in the reactor at 85° C. After five minutes, the addition is begun of the following mixture comprising:

24.25 g of styrene (St), and 1.28 g of methacrylic acid (MAA)

and simultaneously of another mixture comprising:

32.5 g of water, and 0.07 g of $Na_2CO_3$.

The addition lasts 1 hour. The system is maintained at this temperature for an additional hour.

The calculated molecular weight of the first (St/MMA) block is of 5000 g/mol, the calculated molecular weight of the second (EtA/MMA) block is of 62500 g/mol, and the calculated molecular weight of the third (St/MMA) block is of 500 g/mol.

Example 5

Triblock poly(styrene/methacrylic acid)-block-poly (ethyl acrylate/methacrylic acid)-block poly(styrene/ methacrylic acid) (St/MMA)-b-(EtA/MMA)-b-(St/ MMA) wherein St/MMA=80/20 in the First Block, St/MMA=98/2 in the Third Block, and EtA/MMA= 95/5

Step 1: Synthesis of a First Random Block (St/MMA) of Styrene (St) and Methacrylic Acid (MAA) with a Ratio by Weight of St/MAA=80/20

A polymerization is carried out under emulsion conditions in a jacketed reactor equipped with a stainless steel three-bladed stirrer. 555 g of water, 12.05 g of sodium dodecyl sulphate (Aldrich) and 1.50 g of sodium carbonate $Na_2CO_3$ are introduced at ambient temperature as a starting mix. The mixture obtained is stirred for 30 minutes (190 rev/min) during which the temperature is raised to 75° C. Then a mixture comprising 3.00 g of styrene, 2.60 g of methyl α-(o-ethylxanthyl)propionate $(CH_3CHCO_2Me)SCSOEt$, and 0.75 g of methacrylic acid is incorporated. The temperature is subsequently raised to 85° C. and 0.52 g of ammonium persulphate $(NH_4)_2S_2O_8$ are added. After five minutes, the addition is continued of 27.0 g of styrene, 6.75 g of methacrylic acid over one hour. After the addition is completed, an emulsion copolymer (latex) is obtained, which is maintained at 85° C. for one hour.

Step 2: Synthesis of a Second Random Block (EtA/MMA) of Ethyl Acrylate (EtA) and Methacrylic Acid (MMA) with a Ratio by Mass: EtA/MAA=95/5, to Obtain a Diblock Copolymer 101.53 g of the emulsion copolymer obtained above are withdrawn from the reactor. 0.22 g of ammonium persulphate $(NH_4)_2S_2O_8$ and 5.0 g of water are added to the emulsion remaining in the reactor at 85° C. After five minutes, the addition is begun of the following a mixture comprising:

606.3 g of ethyl acrylate (EtA), and 31.91 g of methacrylic acid (MAA)

and simultaneously of another mixture comprising:

512.5 g of water, and 1.77 g of $Na_2CO_3$.

The addition lasts 1 hour. The system is maintained at this temperature for an additional three hours. An emulsion copolymer (latex) is obtained.

Step 3: Synthesis of a Third Random Block (St/MMA) of Styrene (St) and Methacrylic Acid (MMA) with a Ratio by Mass: St/MAA=98/2, to Obtain a Triblock Copolymer 333.07 g of the emulsion copolymer obtained above are withdrawn from the reactor. 0.09 g of ammonium persulphate $(NH_4)_2S_2O_8$ and 4.0 g of water are added to the emulsion remaining in the reactor at 85° C. After five minutes, the addition is begun of the following mixture comprising:

4.0 g of styrene (St), and 0.08 g of methacrylic acid (MAA)

and simultaneously of another mixture comprising:

40.0 g of water, and 0.005 g of $Na_2CO_3$.

The addition lasts 1 hour. The system is maintained at this temperature for an additional hour.

The calculated molecular weight of the first (St/MMA) block is of 3000 g/mol, the calculated molecular weight of the second (EtA/MMA) block is of 62500 g/mol, and the calculated molecular weight of the third (St/MMA) block is of 500 g/mol.

Example 6 (Comparative)

Triblock poly(styrene/methacrylic acid)-block-poly (ethyl acrylate/methacrylic acid)-block poly(styrene/ methacrylic acid) (St/MMA)-b-(EtA/MMA)-b-(St/ MMA) wherein St/MMA=9812 in the First Block, St/MMA=98/2 in the Third Block, and EtA/MMA= 95/5

Step 1: Synthesis of a First Random Block (St/MMA) of Styrene (St) and Methacrylic Acid (MAA) with a Ratio by Weight of St/MAA=98/2

A polymerization is carried out under emulsion conditions in a jacketed reactor equipped with a stainless steel three-bladed stirrer. 660 g of water, 7.54 g of sodium dodecyl sulphate (Aldrich) and 0.31 g of sodium carbonate $Na_2CO_3$ are introduced at ambient temperature as a starting mix. The mixture obtained is stirred for 30 minutes (190 rev/min) during which the temperature is raised to 75° C. Then a mixture comprising 6.82 g of styrene, 4.65 g of methyl α-(o-ethylxanthyl)propionate $(CH_3CHCO_2Me)SCSOEt$, and 0.17 g of methacrylic acid is incorporated. The temperature is subsequently raised to 85° C. and 1.39 g of ammonium persulphate $(NH_4)_2S_2O_8$ are added. After five minutes, the addition is continued of 58.8 g of styrene, 1.57 g of methacrylic acid over one hour. After the addition is completed, an emulsion copolymer (latex) is obtained, which is maintained at 85° C. for one hour.

Step 2: Synthesis of a Second Random Block (EtA/MMA) of Ethyl Acrylate (EtA) and Methacrylic Acid (MMA) with a Ratio by Mass: EtA/MAA=95/5, to Obtain a Diblock Copolymer 67.66 g of the emulsion copolymer obtained above are withdrawn from the reactor. 0.46 g of ammonium persulphate $(NH_4)_2S_2O_8$ and 12 g of water are added to the emulsion remaining in the reactor at 85° C. After five minutes, the addition is begun of the following a mixture comprising:

387.96 g of ethyl acrylate (EtA), and 7.91 g of methacrylic acid (MAA)

and simultaneously of another mixture comprising:

96 g of water, and 0.44 g of $Na_2CO_3$.

The addition lasts 1 hour. The system is maintained at this temperature for an additional three hours. An emulsion copolymer (latex) is obtained.

Step 3: Synthesis of a Third Random Block (St/MMA) of Styrene (St) and Methacrylic Acid (MMA) with a Ratio by Mass: St/MAA=98/2, to Obtain a Triblock Copolymer 392.67 g of the emulsion copolymer obtained above are withdrawn from the reactor. 0.05 g of $Na_2CO_3$ in 5 g of water are added to the emulsion remaining in the reactor. 0.29 g of ammonium persulphate $(NH_4)_2S_2O_8$ and 10 g of water are added to it at 85° C. After five minutes, the addition is begun of the following mixture comprising:

7.33 g of styrene (St), and 0.15 g of methacrylic acid (MAA).

The addition lasts 1 hour. The system is maintained at this temperature for an additional hour.

The calculated molecular weight of the first (St/MMA) block is of 3000 g/mol, the calculated molecular weight of the second (EtA/MMA) block is of 19500 g/mol, and the calculated molecular weight of the third (St/MMA) block is of 500 g/ mol. Some features of the block copolymers of the examples are reported on table 1.

TABLE 1

| Example | Block A | Block B | Block C |
|---------|---------|---------|---------|
| 1 | St/MMA: 80/20<br>5000 g/mol | EtA/MMA 95/5<br>62500 g/mol | / |
| 2 | St/MMA: 80/20<br>5000 g/mol | EtA/MMA 95/5<br>62500 g/mol | St/MMA 98/2<br>500 g/mol |
| 3 (comparative) | St/MMA: 96/4<br>5000 g|mol | EtA/MMA 95/5<br>62500 g/mol | / |
| 4 (comparative) | St/MMA: 96/4<br>5000 g/mol | EtA/MMA 95/5<br>62500 g/mol | St/MMA 95/5<br>500 g/mol |
| 5 | St/MMA: 80/20<br>5000 g/mol | EtA/MMA 95/5<br>62500 g/mol | St/MMA 98/2<br>500 g/mol |
| 6 (comparative) | St/MMA: 96/4<br>3000 g/mol | EtA/MMA 95/5<br>62500 g/mol | St/MMA 98/2<br>500 g/mol |

Example 7

Stress/strain Tests

Films of the block copolymers of the examples above are cast and dried in a silicon mold at room temperature for two days, then oven cured at 50° C. for 24 hours and finally at 75° C. for 2 hours. The obtained film is about 1 mm thick. Strips of 4 cm long and 2 cm wide are cut form the films to perform mechanical testing.

A stress/strain experiment is performed with an INSTRON 5543. A constant strain rate is applied with a fixed elongation speed of 2 mm/s. The stress is measured versus elongation (stress/strain curve). The maximum possible elongation with this machine is of 3000%.

The two following different behaviors are reported:

Elastic behavior: constant increase of the stress then sudden rupture at a critical stress. The stress (in mega Pascal :MPa) and the elongation (in %) at break are reported.

Plastic behavior: no rupture below 3,000% deformation, a maximum strain observed at a low stress value in the stress/strain curve, then a flowing behavior with a decreasing stress with a deformation increase. There is no break, the sample is flowing. Only the maximum of the stress/strain curve in (mega Pascal: MPa) is reported.

Results are reported on table 2.

TABLE 2

| Polymer of example: | Behavior | Stress (MPa) | Elongation (%) at break |
|---------------------|----------|--------------|-------------------------|
| 1 | Elastic | 3.05 (break) | 1000 |
| 2 | Elastic | 2.75 (break) | 1150 |
| 3 (comparative) | Plastic | 0.9 (maximum) | Not applicable |
| 4 (comparative) | Plastic | 1.0 (maximum) | Not applicable |
| 5 | Elastic | 1.4 | 1600 |
| 6 (comparative) | Plastic | 0.2 (maximum) | Not applicable |

Example 8

Dynamic Mechanical Analysis (DMA) Tests

Dynamic Mechanical Analysis (DMA) are performed on block copolymer films. The glass transition of the soft block, the elastic modulus of the elastic plateau, and the fusion of the stiff block (high Tg) are measured. Complex moduli (in Pa) of the polymer blocks are measured at different temperatures (the temperature is increased) at a constant frequency of 1 Hz. The apparatus used is Universal V3. 1B TA Instruments, using a temperature ramp/single frequency method. The geometry is either shear or extensional. A first decrease of the complex modulus with temperature increase, typically from $10^9$ Pa to $10^6$ Pa is considered as corresponding to the Tg of the soft block. Then the modulus is constant when increasing the temperature (elastic plateau). The constant modulus is reported as the elastic plateau modulus. Then it decreases sharply again when reaching the temperature considered as corresponding to the high Tg of the polymer. This higher temperature is considered as corresponding to the melting of the polymer (thermoplastic property).

Results are reported on table 3.

TABLE 3

| Polymer of example: | elastic plateau modulus (Pa) | Melting temperature (° C.) |
|---|---|---|
| 1 | $10^6$ | 45 |
| 2 | $10^6$ | 45 |
| 3 (comparative) | $10^6$ | 30 |
| 4 (comparative) | $10^6$ | 30 |
| 5 | $10^6$ | 45 |
| 6 (comparative) | No elastic plateau observed | 10 |

Polymers of comparative example 3, 4 and 6 don't present an elastomeric behavior. The cohesion of the polymer is weak. The polymers are flowing. They present a poor thermoplastic behavior. Polymers of example 1, 2 and 5 present a strong elastomeric behavior and a thermoplastic behavior. The elastomeric properties are good even though the molecular weight of the stiff block is low (5000 g/mol for polymers according to examples 1 and 2), and even very low (3000 g/mol for polymers according to example 5).

What is claimed is:

1. A block copolymer, being a diblock (block A)-(bloc B) copolymer, a triblock (block A)-(block B)-(block A), or a triblock (block A)-(block B)-(block C) copolymer,
   block A being a stiff block, comprising at least 55% of repetitive units deriving from a stiff monomer selected from the group consisting of styrene, isobornyl acrylate, and isobornylmethacrylate,
   block B being a soft block, comprising at least 55% of repetitive units deriving from a soft monomer selected from the group consisting of esters of acrylic acid, esters of methacrylic acid, and mixtures thereof,
   block C being a stiff block, comprising repetitive units deriving from a stiff monomer selected from the group consisting of styrene, isobornyl acrylate, and isobornylmethacrylate, wherein:
   block A comprises at least 6% by weight of units deriving from a block A segregation monomer selected from the group consisting of acrylic acid, methacrylic acid, acrylonitrile, methacrylonitrile, 2-vinylpyridine, and 4-vinylpyrridine, or
   block B comprises at least 6% by weight of units deriving from a block B segregation monomer selected from the group consisting of acrylic acid, methacrylic acid, acrylonitrile, methacrylonitrile, and vinylpyrrolidones, and
   the block copolymer has a molecular weight of more than 10,000 g/mol.

2. A block copolymer according to claim 1, wherein block A comprises at least 10% by weight of units deriving from the block A segregation monomers, or block B comprises at least 10% by weight of units deriving from the block B segregation monomers.

3. A block copolymer according to claim 1, wherein the molecular weight of the block copolymer is of more than 25,000 g/mol.

4. A block copolymer according to claim 1, wherein the molecular weight of the block copolymer is of more than 50,000 g/mol.

5. A block copolymer according to claim 1, wherein the molecular weight of the block copolymer is of less than or equal to 100000 g/mol.

6. A block copolymer according to claim 1, wherein block A has a molecular weight comprised between 3000 and 15000 g/mol.

7. A block copolymer according to claim 3, wherein block B has a molecular weight comprised between 20000 and 80000 g/mol.

8. A block copolymer according to claim 1, having ratio between the weight-average molecular weight of block A, and the weight-average molecular weight of block B of between 0.045 and 0.5.

9. A block copolymer according to claim 1, wherein:
   block A comprises from 75% to 90% by weight of units deriving form styrene, and from 10% to 25% by weight of units deriving form acrylic acid or methacrylic acid, and
   block B comprises at least 75% by weight of units deriving from ethyl acrylate, butyl acrylate, or mixtures thereof.

10. A block copolymer according to claim 9, being a diblock (block A)-(block B) copolymer wherein block A comprises units deriving from styrene and units deriving from methacrylic acid, and block B comprises units deriving from ethyl acrylate.

11. A block copolymer according to claim 1, being a triblock (block A)-(block B)-(block A) copolymer wherein block A comprises units deriving from styrene and units deriving from methacrylic acid, and block B comprises units deriving from ethyl acrylate.

12. A block copolymer according to claim 1, being a triblack (block A)-(block B)-(block A) copolymer wherein block A comprises units deriving from styrene and units deriving from methacrylic acid, and block B comprises units deriving from butyl acrylate.

13. A block copolymer according to claim 1, being a triblock (block A)-(block B)-(block A) copolymer wherein block A comprises units deriving from styrene and units deriving from methacrylic acid, and block B comprises units deriving from 2-ethylhexyl acrylate.

14. A block copolymer according to claim 1, being a triblock (block A)-(block B)-(block C) copolymer wherein block A comprises units deriving from styrene and units deriving from methacrylic acid, block B comprises units deriving from butyl acrylate, ethyl acrylate or mixtures thereof, and block C comprises units deriving from styrene.

15. A block copolymer according to claim 1, wherein, in a solid or dried form, the soft block forms a continuous soft phase, and the stiff block(s) forms a stiff phase, the stiff phase being dispersed in the soft phase.

16. A block copolymer according to claim 15, being a thermoplastic polymer in a solid or dried form.

17. A block copolymer according to claim 1, having in a solid or dried form, having an elongation at break of at least 500% and tensile strength of at least 1.5 MPa.

18. A block copolymer according to claim 1, obtained by a sequenced living free-radical polymerization process.

19. A block copolymer according to claim 17, wherein the polymerization process involves using as transfer agent comprising a group of formula —S—C(S)—Y—, —S—C(S)—S—, or —S—P(S)—Y—, or —S—P(S)—S—, wherein Y is an atom different from sulfur.

20. A block copolymer according to claim 1, being dispersed in an aqueous medium in a latex form.

* * * * *